(No Model.)

G. B. NAGLE.
SPITTOON CARRIER.

No. 504,607. Patented Sept. 5, 1893.

WITNESSES:
Paul Johst
E. M. Clark

INVENTOR
G. B. Nagle
BY
Munn & Co
ATTORNEYS.

_

UNITED STATES PATENT OFFICE.

GERARD B. NAGLE, OF REVELSTOKE, CANADA.

SPITTOON-CARRIER.

SPECIFICATION forming part of Letters Patent No. 504,607, dated September 5, 1893.

Application filed January 10, 1893. Serial No. 457,936. (No model.)

*To all whom it may concern:*

Be it known that I, GERARD B. NAGLE, of Revelstoke, in the Province of British Columbia and Dominion of Canada, have invented a new and Improved Spittoon-Carrier, of which the following is a full, clear, and exact description.

The object of the invention is to provide a new and improved spittoon carrier, which is simple and durable in construction, and arranged for conveniently and firmly clasping a spittoon, lifting it, and carrying it about to any desired place for emptying, cleaning and other purposes, without the operator soiling his hands.

The invention consists of a pair of tongs pivoted on the end of a handle, and an opening and closing device arranged on the handle and connected with the said pair of tongs to close the latter on the neck of the spittoon.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1:
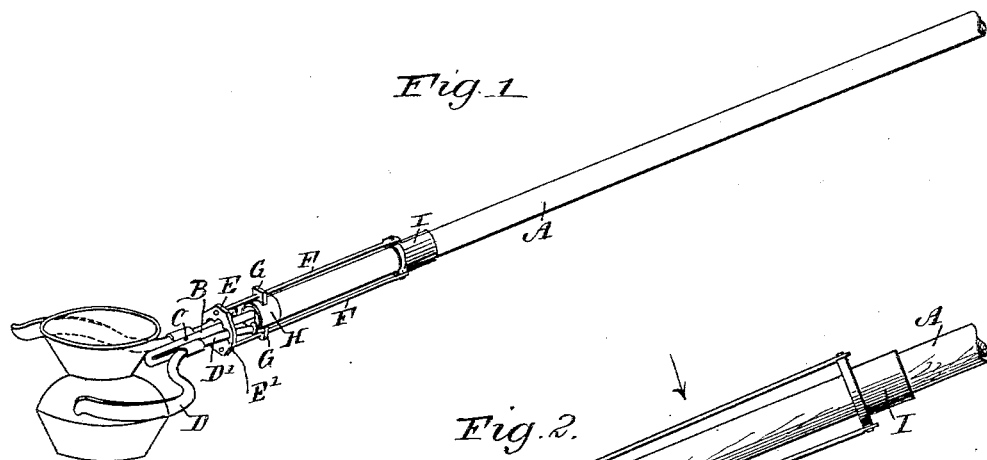
Figure 2:
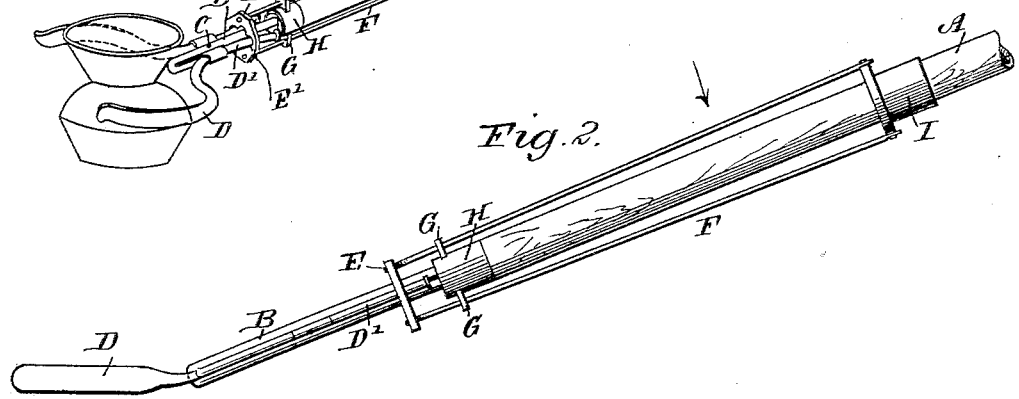
Figure 3:
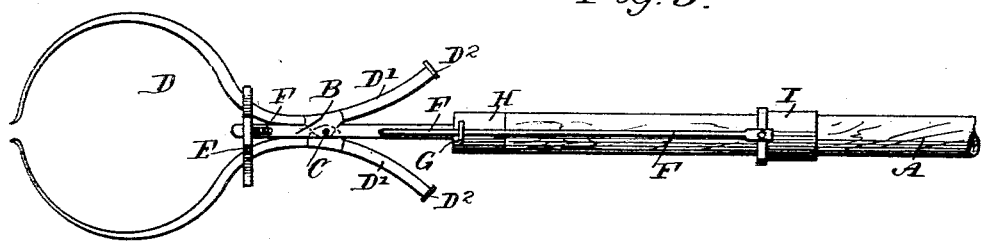

Figure 1 is a perspective view of the improvement as applied. Fig. 2 is an enlarged side elevation of the same, and Fig. 3 is a plan view of the same with parts broken out.

The improved spittoon carrier is provided with a handle A, on one end of which is secured a rod B, preferably doubled up, as shown, and carrying a pivot C for a pair of tongs D, adapted to engage the neck of a spittoon of the usual construction. The tongs D are curved so as to firmly engage the neck of the spittoon when they are closed, and when the said tongs are opened they can readily be passed upon the spittoon so that in closing they engage the neck to clasp the spittoon.

The shanks D' of the members of the tongs extend rearwardly beyond the pivot C, and the said shanks pass through an elongated aperture E' formed in a plate E fitted to slide on the rod B, as will be readily understood by reference to the drawings. The rearward motion of the plate E on the shanks D' is limited by the heads D² formed on the rear ends of the said shanks and adapted to abut against the rear face of the said plate E when the latter is moved into its extreme rearmost position. The plate E is rigidly connected with two rods F mounted to slide in bearings G formed on the ferrule H attached to the end of the handle A carrying the rod B. The rods F extend in line with the handle and on the top and bottom of the same, the rear ends of the said rods being rigidly connected with a sleeve I mounted to slide loosely on the handle A.

The operation is as follows: When the several parts are in the position shown in Fig. 1, then the sleeve I is in an outermost position on the handle A, whereby the plate E presses on the rearward extensions of the shanks D', so as to hold the tongs D open. The said tongs can now be passed in an open position upon the neck of the spittoon, and then the operator pushes on the sleeve I, so as to move the latter downward on the handle A, thus causing a like downward sliding of the plate E, which latter, after passing beyond the pivot C, causes the tongs D to close by engaging the curved parts of the shanks of the said pair of tongs. The latter, in closing, firmly clasp the neck of the spittoon, so that the latter can be carried about conveniently on the handle A, which is taken hold of by the operator. The end of the rod B also abuts against one side of the spittoon, so that when the tongs are closed the spittoon is very securely held in position and the operator can conveniently pass the spittoon into a tub for washing the spittoon, it being understood that the operator does not touch the spittoon, but merely manipulates the handle and the cleaning device for the said spittoon. When it is desired to release the spittoon the operator shifts the sleeve I upward on the handle A, so that the plate E, acting on the rear curved parts of the shanks D', causes the opening of the tongs, so as to disengage the latter from the neck of the spittoon.

It will be seen that this device is very simple and durable in construction, can be readily manipulated to engage or disengage the spittoon, and when engaged permits the operator to conveniently carry the spittoon about from place to place for cleaning or other purposes.

Having thus fully described my invention,

I claim as new and desire to secure by Letters Patent—

1. The combination with a handle of a pair of tongs pivoted between their ends to the handle the shank of the tongs in rear of their pivots being curved or inclined outwardly from each other and a slide movable along the tongs across the pivotal point thereof; whereby when the slide is in front of the pivot the tongs will be locked in their closed position and when in rear of the pivot on the rear extensions the tongs will be held open, substantially as set forth.

2. In a device of the class described, the combination with a handle, of a pair of tongs pivoted thereon and provided with rearwardly extending shanks, an apertured plate engaging the said shanks of the said tongs, rods connected with the said plate and mounted to slide in bearings on the said handle, and a sleeve fitted to slide on the said handle and connected with the said rods, substantially as shown and described.

3. In a device of the class described, the combination with a handle provided at one end with a projecting rod, of a pair of tongs pivoted on the said projecting rod and adapted to engage the neck of the spittoon, the said pair of tongs being provided with rearwardly extending curved shanks, an apertured plate fitted to slide on the said projecting rod and engaging the shanks of the pair of tongs, rods rigidly connected with the said plate and fitted to slide in bearings on the said handle, and a sleeve fitted to slide on the handle and connected with the said rods, substantially as shown and described.

GERARD B. NAGLE.

Witnesses:
J. GUY. BARBER,
J. P. SUTHERLAND.